United States Patent [19]
Feigel et al.

[11] Patent Number: 5,826,952
[45] Date of Patent: Oct. 27, 1998

[54] BRAKE SYSTEM FOR AUTOMOTIVE VEHICLES

[75] Inventors: Hans-Jorg Feigel, Rosbach; Ulrich Neumann, Robdorf; Lothar Schiel, Hofheim, all of Germany

[73] Assignee: ITT Automotive Europe GmbH, Frankfurt, Germany

[21] Appl. No.: 632,448

[22] PCT Filed: Oct. 18, 1994

[86] PCT No.: PCT/EP94/03427

§ 371 Date: Jul. 1, 1996

§ 102(e) Date: Jul. 1, 1996

[87] PCT Pub. No.: WO95/11147

PCT Pub. Date: Apr. 27, 1995

[30] Foreign Application Priority Data

Oct. 19, 1993 [DE] Germany .......................... 43 35 676.1

[51] Int. Cl.⁶ .................................................. B60T 8/36
[52] U.S. Cl. .................................... 303/119.2; 303/116.2; 303/113.2
[58] Field of Search ............................ 303/119.2, 116.1, 303/116.2, 113.1, 113.2; 364/426.01, 426.02, 426.03

[56] References Cited

U.S. PATENT DOCUMENTS

| | | | |
|---|---|---|---|
| 3,877,760 | 4/1975 | Cole et al. ........................... | 303/119.2 |
| 4,844,559 | 7/1989 | Harrison ............................... | 303/119.2 |
| 5,332,304 | 7/1994 | Maas ................................... | 303/119.2 X |

FOREIGN PATENT DOCUMENTS

| | | |
|---|---|---|
| 0317182A2 | 11/1988 | European Pat. Off. . |
| 0355324A1 | 6/1989 | European Pat. Off. . |
| 0395262A2 | 4/1990 | European Pat. Off. . |
| 2450874A1 | 10/1974 | Germany . |
| 3526192A1 | 7/1985 | Germany . |
| 8521133 U | 7/1985 | Germany . |
| 3723916C2 | 7/1987 | Germany . |
| 4208496C1 | 3/1992 | Germany . |
| 4218484A1 | 6/1992 | Germany . |

*Primary Examiner*—Peter M. Poon
*Attorney, Agent, or Firm*—J. Gordon Lewis; Thomas N. Twomey

[57] ABSTRACT

A brake system for automotive vehicles includes a pressure generator to which wheel brake cylinders associated with the individual vehicle wheels are connected by way of hydraulic connections. Actuator units including a cylinder-and-piston assembly and an actuator are inserted into the hydraulic connections. The actuator units permit shutting off the hydraulic connections. To convert the brake system into an active brake system, when the pressure generator and at least one actuator unit are simultaneously actuated, the force resulting from the pressure build-up in the pressure generator and the external actuating force produced by the actuator are applied jointly to the piston of the cylinder-and-piston assembly.

7 Claims, 6 Drawing Sheets

BRAKE SYSTEM FOR AUTOMOTIVE VEHICLES

BACKGROUND OF THE INVENTION

The present invention relates to a brake system for automotive vehicles including a pedal-operable pressure generator connected to wheel brake cylinders of wheel brakes associated with the individual wheels, at least two actuator units actuatable independently of the pressure generator and arranged in hydraulic connections between pressure generator and wheel brake cylinders to permit shutting off the hydraulic connections, each of the actuator units including one cylinder-and-piston assembly and one actuator, and an electronic controller whose control signals serve to actuate the actuator units, wherein, on simultaneous actuation of the pressure generator and at least one actuator unit, the force resulting from the pressure build-up in the pressure generator is added to the external actuating force generated by the actuator and applied to the piston of the cylinder-and-piston assembly.

European patent application EP 0 395 262 A2, for example, discloses a brake system of this type. In the prior art brake system, the actuator unit is a hydraulic cylinder having a piston with a gear profile. The gear profile is engaged by a rotary pinion driven by an electric motor, and the rotary movement of the pinion is converted into a translational movement of the piston. A disadvantage of the prior art brake system is the unfavorable efficiency of the actuator which is due to the complicated way of conversion of the electrical energy, that is to be conducted to the electric motor, into the displacing movement of the hydraulic piston. In addition, major problems during the assembly or mounting of the known actuator unit can be caused by the positioning of the electric motor vertically relative to the longitudinal axis of the cylinder and by the comparatively high weight.

Therefore, an object of the present invention is to propose a brake system of the previously mentioned type which permits accomplishing an increased efficiency of the actuator. In addition, small dimensions and a low weight of the actuator units shall be provided.

SUMMARY OF THE INVENTION

According to a first solution of the object to be achieved by the present invention, the actuator is an electromagnet whose armature is the piston of the cylinder-and-piston assembly.

In another preferred aspect of the present invention, the stroke operation of the electromagnet is optimally utilized because the electromagnet is a stroke magnet whose action of force is controlled irrespective of stroke in response to output signals of a magnetic flux sensor. Alternatively, the action of force of the stroke magnet can be controlled in response to output signals of a differential pressure sensor sensing the pressure differential between the pressure generated by the pressure generator and the output pressure of the cylinder-and-piston assembly.

In an embodiment of the present invention which is compact and inexpensive to manufacture, the cylinder-and-piston assembly and the actuator are accommodated in one housing.

It is favorable in a pressure-tight design of the housing that the piston is a hollow piston which is sealedly guided on a cylindrical port and defines a hydraulic annular chamber in the housing to which the hydraulic pressure of the pressure generator can be applied.

In non-pressure-tight housing designs, the piston is a stepped hollow piston which is sealedly guided on a cylindrical port and defines in the housing a pneumatic annular chamber which is connected to the end surface of the large-diameter step remote from the annular chamber, and the small-diameter step is sealed in the housing and can be acted upon by the hydraulic pressure of the pressure generator.

A filter element can precede the small-diameter step, serving additionally as a stop for the valve member of a central valve which shuts off the hydraulic connection between pressure generator and wheel brakes.

According to a second solution of the object to be achieved by the present invention, wherein the actuator of the cylinder-and-piston assembly is a hydraulic auxiliary pressure source, the auxiliary pressure source is a high-pressure accumulator which is connectable to a hydraulic pump, preferably, by way of a charging valve. On the other hand, the hydraulic pump is connectable to the pressure generator by way of a change-over valve or pressure-limiting valve. One of the pumps which are already provided in the vehicle, for example, the ABS pump or the power steering pump, can be used as the hydraulic pump.

In this arrangement, all cylinder-and-piston assemblies can be connected to a central actuator by way of separating valves. In a design wherein the separating valves are electromagnetically operable normally open or normally closed two-way/two-position directional control valves, advantageously, low-cost ABS valves can be used.

In another preferred aspect of the present invention, all cylinder-and-piston assemblies are connectable to the high-pressure accumulator by way of pressure control valves. It is achieved by this provision that independent assist pressure of a constant amount is available even if the pressure in the pressure generator generated by the driver changes.

The pressure control valves can take the shape of electromagnetically operable three-way/three-position directional control valves which, in a first switch position (initial position), permit a connection of the cylinder-and-piston assemblies to an unpressurized pressure fluid supply reservoir, with a simultaneous disconnection of the high-pressure accumulator. In a second switch position, the pressure control valves separate the cylinder-and-piston assemblies from the high-pressure accumulator and from the pressure fluid supply reservoir. In a third switch position, the valves provide a connection between the cylinder-and-piston assemblies and the high-pressure accumulator, with a simultaneous disconnection of the pressure fluid supply reservoir.

Still another preferred aspect of the present invention includes a hydraulic wheel slip control system which operates according to the recirculation principle. The actuator units are arranged at the outlet of the return pump in front of the inlet valve respectively associated with a wheel brake cylinder.

It is ensured by the above-mentioned provisions that the independent assist braking pressure also is automatically controlled in an ABS control operation.

To permit use of anti-lock brake systems which are already provided in a vehicle for driving stability control purposes, the actuator units are interposed between the inlet valve respectively associated with a wheel brake cylinder and the related wheel brake cylinder according to another preferred aspect of the present invention.

To prevent wheel lock caused by generation of the independent assist pressure, it is required that the controller (driving stability controller) which actuates the actuator units can be influenced by output signals of the ABS/TCS controller.

Also, it is appropriate that the actuator units are integrated in the valve block, in particular, in ABS control systems having a valve block which accommodates both the ABS valves and the return pump.

The present invention will be explained in more detail in the following description by way of four embodiments with reference to the accompanying drawings.

DESCRIPTION OF THE PREFERRED EMBODIMENTS

Figure 1:
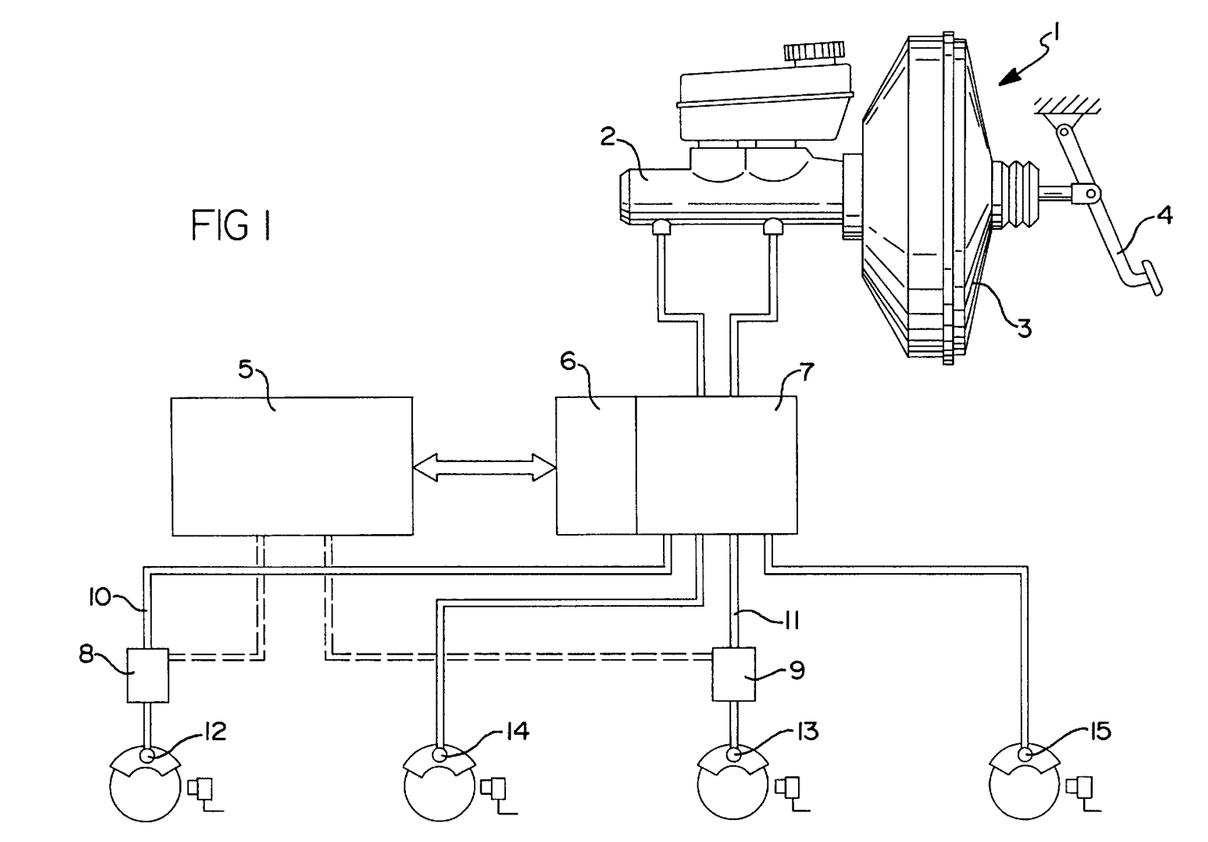
FIG. 1 is a simplified view of a hydraulic wiring diagram of a first embodiment of the brake system according to the present invention.

The brake system for automotive vehicles according to the present invention shown in FIG. 1 generally includes a pressure generator 1, a hydraulic unit 7 (shown only schematically) forming along with a first electronic controller (ABS/TCS controller 6) an antilock system, wheel brakes or wheel brake cylinders 12, 13, 14, 15, actuator units 8, 9 which are actuatable independently of the pressure generator 1 or operable externally, and a second electronic controller (DSC (Driving Stability Control) controller) 5 whose control signals serve to actuate the actuator units 8, 9. Each of the vehicle wheels (not shown) is associated with a wheel sensor (not referred to in detail). The control signal of the wheel sensor representative of the wheel speed is supplied to the ABS/TCS controller 6. The arrangement of the wheel brake cylinders 12, 13, 14 and 15 is preferably selected so that the wheel brake cylinders 12, 13 are associated with one vehicle axle, for example, the driven front axle, and the wheel brake cylinders 14, 15 are associated with the other vehicle axle, for example the non-driven rear axle of an automotive vehicle. The actuator units 8, 9 are inserted into hydraulic lines 10 and 11 leading to the wheel brake cylinders 12, 13 such as to permit closure of the lines. The pressure generator 1, in turn, includes a pneumatic brake power booster, preferably a vacuum brake power booster 3, operable by an actuating pedal or brake pedal 4. Connected downstream of the brake power booster is a dual-circuit master brake cylinder, preferably a tandem master cylinder 2 which is connected to the hydraulic unit 7.

Figure 2:
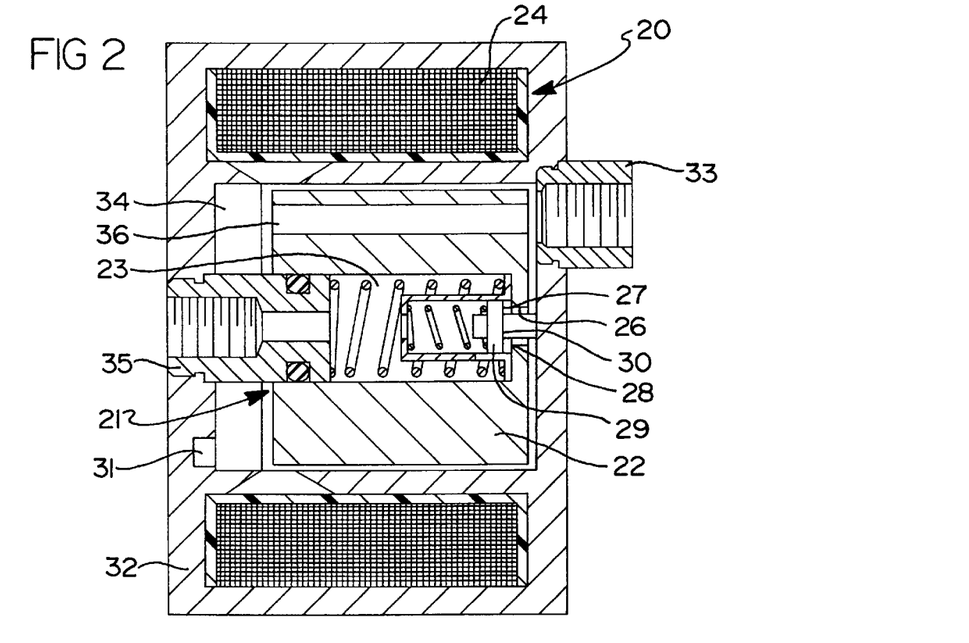
FIG. 2 is a first embodiment of actuator units which can be used in the brake system of FIG. 1.
Figure 3:
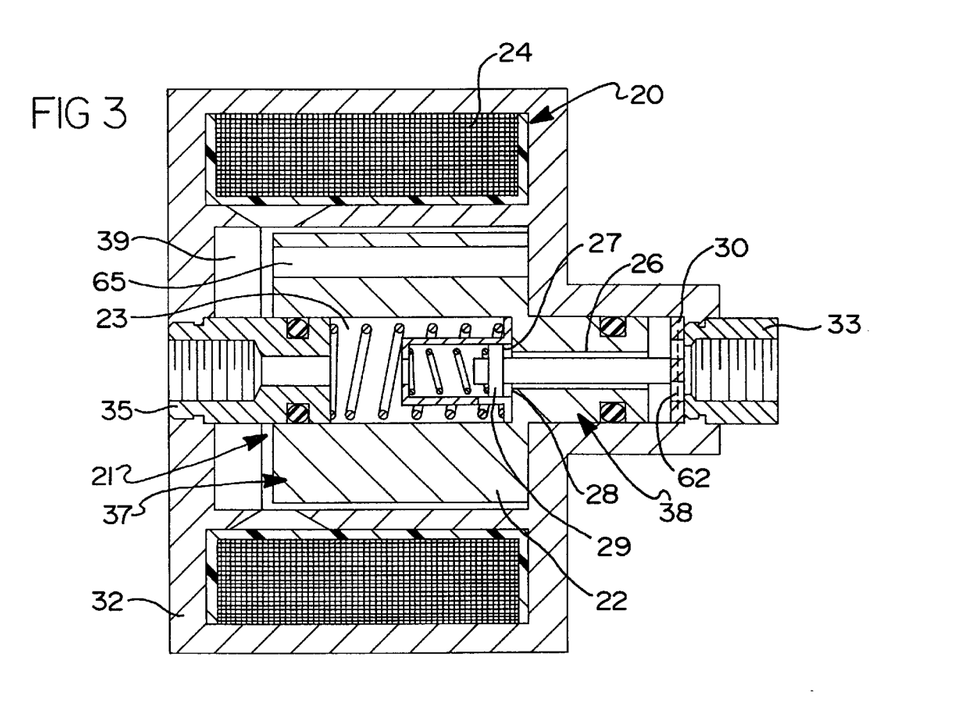
FIG. 3 is a second embodiment of actuator units which can be used in the brake system of FIG. 1.
Figure 4:
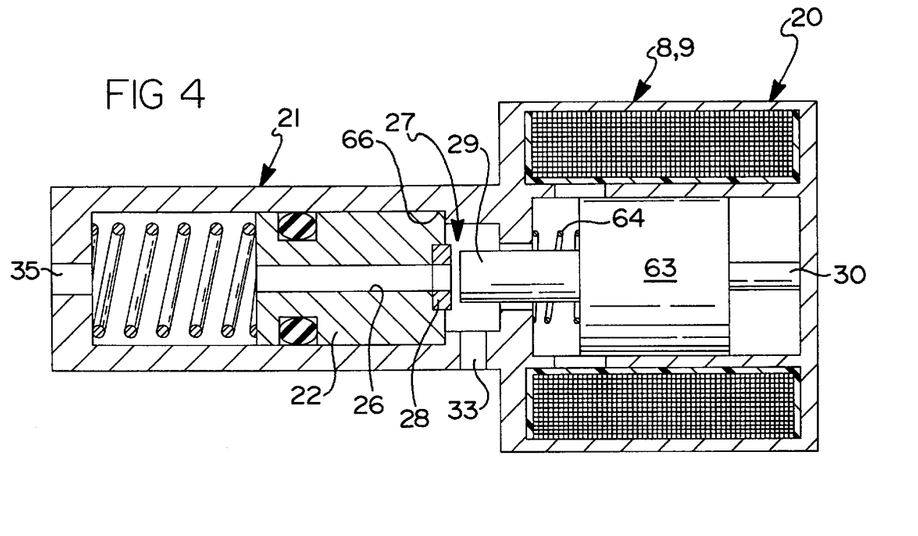
FIG. 4 is a third embodiment of actuator units which can be used in the brake system of FIG. 1.

As is shown especially in FIGS. 2, 3 and 4, each of the actuator units 8, 9 has a hydraulic cylinder-and-piston assembly 21 which is controlled by an actuator 20. The actuator 20 enables remote actuation of the cylinder-and-piston assembly 21. The actuator unit shown in FIG. 2 has a housing 32 which includes a first (inlet) port 33 and a second (outlet) port 35. Inside the housing 32, a hydraulic piston 22 is axially movable. Hydraulic piston 22, in the shape of an annular piston, is sealedly guided on the outlet port 35 and includes a pressure chamber 23 in its interior. The pressure chamber 23 is connected to the inlet port 33 by way of a bore 26 provided in the end surface of piston 22 close to the inlet port 33. Bore 26 is adapted to be shut off by way of a central valve 27. The central valve 27 includes a preferably annular sealing seat 28, provided on piston 22, and a valve member 29 which cooperates with the sealing seat and is resiliently biased in the closing direction. In the inactive position of piston 22, valve member 29 is retained in axial abutment on a stop 30 on the housing at a distance from sealing seat 28, whereby a hydraulic connection is established between inlet port 33 and outlet port 35. Further, piston 22 in the housing defines an annular chamber 34 which, through a bore 36 in the piston 22, is connected to the inlet port 33 or the end surface of the piston 22 close to the inlet port 33. During a quick actuation, pressure compensation is thereby permitted between the annular chamber 34 and the inlet port 33. The mentioned stop 30 is provided by the area of the housing 32 that is axially opposite the valve member 29.

The actuator 20 of the actuator units shown in FIGS. 2 to 4 is arranged coaxially relative to the piston-and-cylinder assembly 21 and includes an electromagnet 24, with its armature formed by piston 22. The electromagnet 24 can be a stroke magnet. Housing 32 accommodates a sensor, for example, a Hall sensor 31, which senses the magnetic flux of the electromagnet 24 and is axially opposite the piston 22. The output signals of the Hall sensor 31 are supplied to the DSC controller 5 controlling the force of the electromagnet 24 irrespective of stroke or piston position. Another possibility involves controlling of force of the electromagnet 24 in response to the output signals of a differential pressure sensor 57, 58 (FIG. 8) which senses the pressure difference between the inlet and outlet pressures of the actuator unit 8, 9.

The arrangement of the actuator 20 of the actuator unit illustrated in FIG. 3 is identical with the embodiment described in FIG. 2. The piston 22 in the embodiment shown in FIG. 3 is a stepped piston whose large diameter step 37 is sealedly guided on the cylindrical outlet port 35. Small-diameter step 38 of piston 22 is sealedly guided in the housing 32 and is axially opposite the inlet port 33 so that it can be acted upon by the hydraulic pressure generated in the braking pressure generator 1. The large-diameter step 37 defines in the housing 32 a pneumatic annular chamber 39 which is connected to the end surface of step 37 close to the inlet port 33 by way of a bore 65 that extends in piston 22 in parallel to the axis of the piston. This connection permits a pneumatic pressure balance between the annular chamber 39 and the pneumatic chamber defined by the front surface facing the inlet port 33 upon actuation of the actuator unit.

To prevent the ingress of dirt particles proximate the central valve 27, a filter element 62 precedes the small-diameter step 38. In the inactive position, valve member 29 is in axial abutment with the filter element 62 which, thus, serves as the above-mentioned stop 30 on the housing.

In the electrohydraulic actuator unit shown in FIG. 4, the valve member 29 of the central valve 27 is finally formed of an axial extension of the armature 63 of the electromagnet 24 which is biased by a compression spring 64 in opposition to the closing direction of the central valve 27. The inlet port 33 in the illustrated embodiment is arranged vertically to the longitudinal axis of the cylinder-and-piston assembly 21. The outlet port 35 is arranged coaxially to the piston 22 which, in the inactive position, is positioned by abutting on an annular surface 66 in the housing 32.

Figure 5:
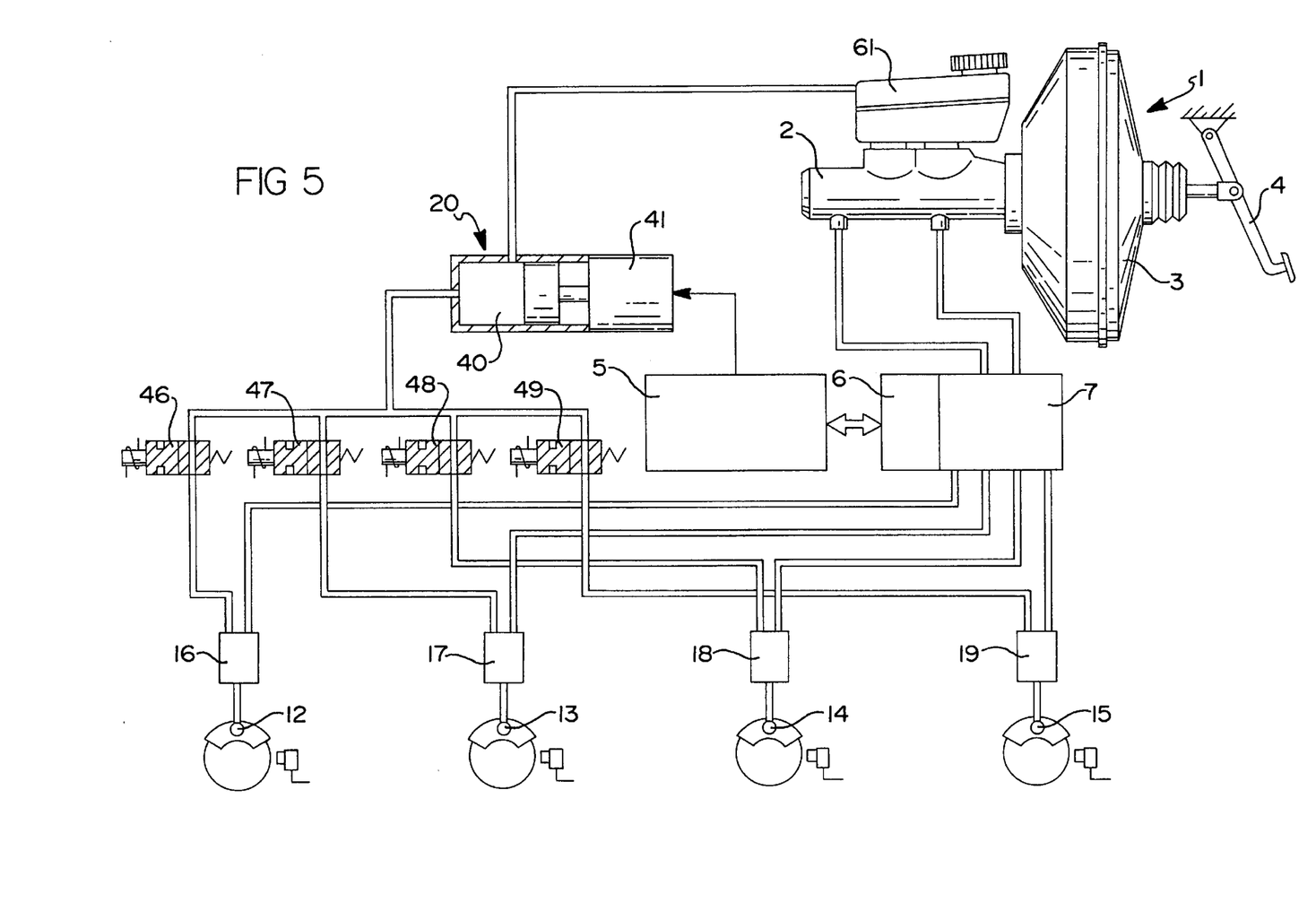
FIG. 5 is a hydraulic wiring diagram of a second embodiment of the brake system according to the present invention.

In the brake system according to the present invention shown in FIG. 5, hydraulically operable cylinder-and-piston assemblies 16, 17, 18, 19 precede the individual wheel brake cylinders 12, 13, 14, 15 and are operable by a joint hydraulic auxiliary pressure source. The auxiliary pressure source includes an electric drive unit 41, for example an electromotively operable spindle-nut drive succeeded by an auxiliary cylinder 40 in terms of effect. The individual cylinder-and-piston assemblies 16, 17, 18 and 19 are connected to the auxiliary cylinder 40 by way of separating valves 46, 47, 48, 49 which are preferably designed as electromagnetically operable, normally open (SO) or normally closed (SG) two-way/two-position directional control valves. Both the separating valves 46, 47, 48, 49 and the drive unit 41 are actuated by control signals of the DSC controller 5.

Figure 6:
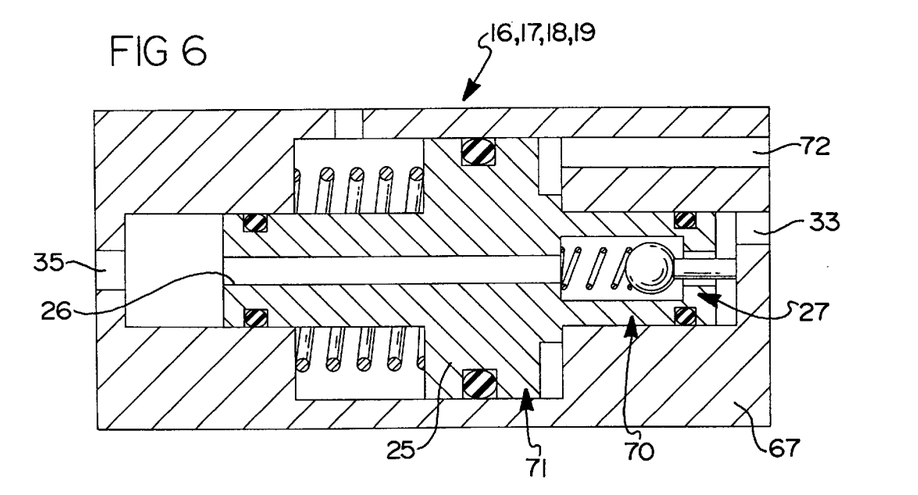
FIG. 6 is an embodiment of actuator units which can be used in the brake system of FIG. 5.

FIG. 6 is an axial cross-sectional view of the previously mentioned hydraulically operable cylinder-and-piston assemblies 16, 17, 18 and 19. The illustrated assembly includes a stepped piston 25 which is sealed and movable in a housing 67. The pressure generated in the pressure generator 1 can be applied to the small-diameter step 70 of the stepped piston 25. The large-diameter step 71 or its end surface can be acted upon by the independent assist pressure generated and supplied by the auxiliary pressure source by way of a third hydraulic port 72.

Figure 7:
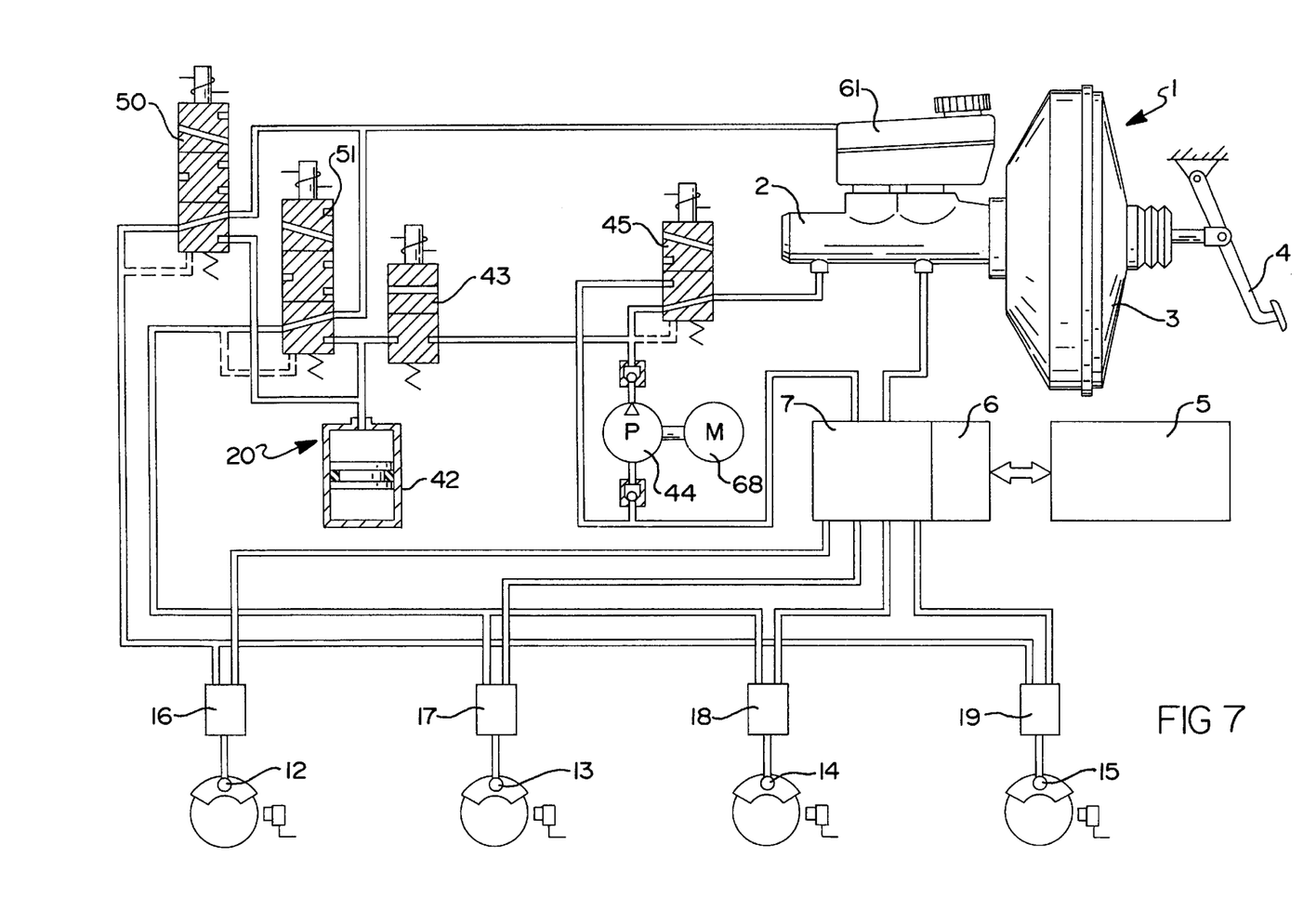
FIG. 7 is a hydraulic wiring diagram of a third embodiment of the brake system according to the present invention.

In the brake system according to the present invention shown in FIG. 7, the hydraulic auxiliary pressure source includes a high-pressure accumulator 42 which, by way of a charging valve 43, is connected to a pump 44 that is drivable by an electric motor 68. On the other hand, pump 44 is connected to the pressure generator 1 or the tandem master cylinder 2 by the intermediary of a change-over or pressure-limiting valve 45. The suction side of pump 44 is connected to the hydraulic unit 7 of the anti-lock system, which is shown only schematically. The charging valve 43, which is drivable by control valves of the DSC controller 5, is an electromagnetically operable, preferably normally closed two-way/two-position directional control valve. The change-over or pressure-limiting valve 45, which is used especially during traction slip control operations, is an electromagnetically operable three-way/two-position directional control valve which disconnects the pump 44 from the tandem master cylinder 2 in its second switch position and establishes a connection between the tandem master cylinder 2 and the hydraulic unit 7. The cylinder-and-piston assemblies 16, 17, 18, 19 mentioned with respect to FIGS. 5 and 6 are connected in pairs to the high-pressure accumulator 42 by way of pressure control valves 50, 51 which are provided as electromagnetically operable three-way/two-position directional control valves. In a first switch position, i.e., the initial position of the pressure control valves 50, 51 corresponding to the deenergized condition, the cylinder-and-piston assemblies 16 to 19 are in connection with a pressure fluid supply reservoir 61 associated with the tandem master cylinder 2 and isolated from the high-pressure accumulator 42. In a second switch position, the cylinder-and-piston assemblies 16, 17, 18, 19 are separated from both the pressure fluid supply reservoir 61 and the high-pressure accumulator 42. In a third switch position, the cylinder-and-piston assemblies 16, 17, 18, 19 are connected to the high-pressure accumulator 42 and disconnected from the pressure-fluid supply reservoir 61.

Figure 8:
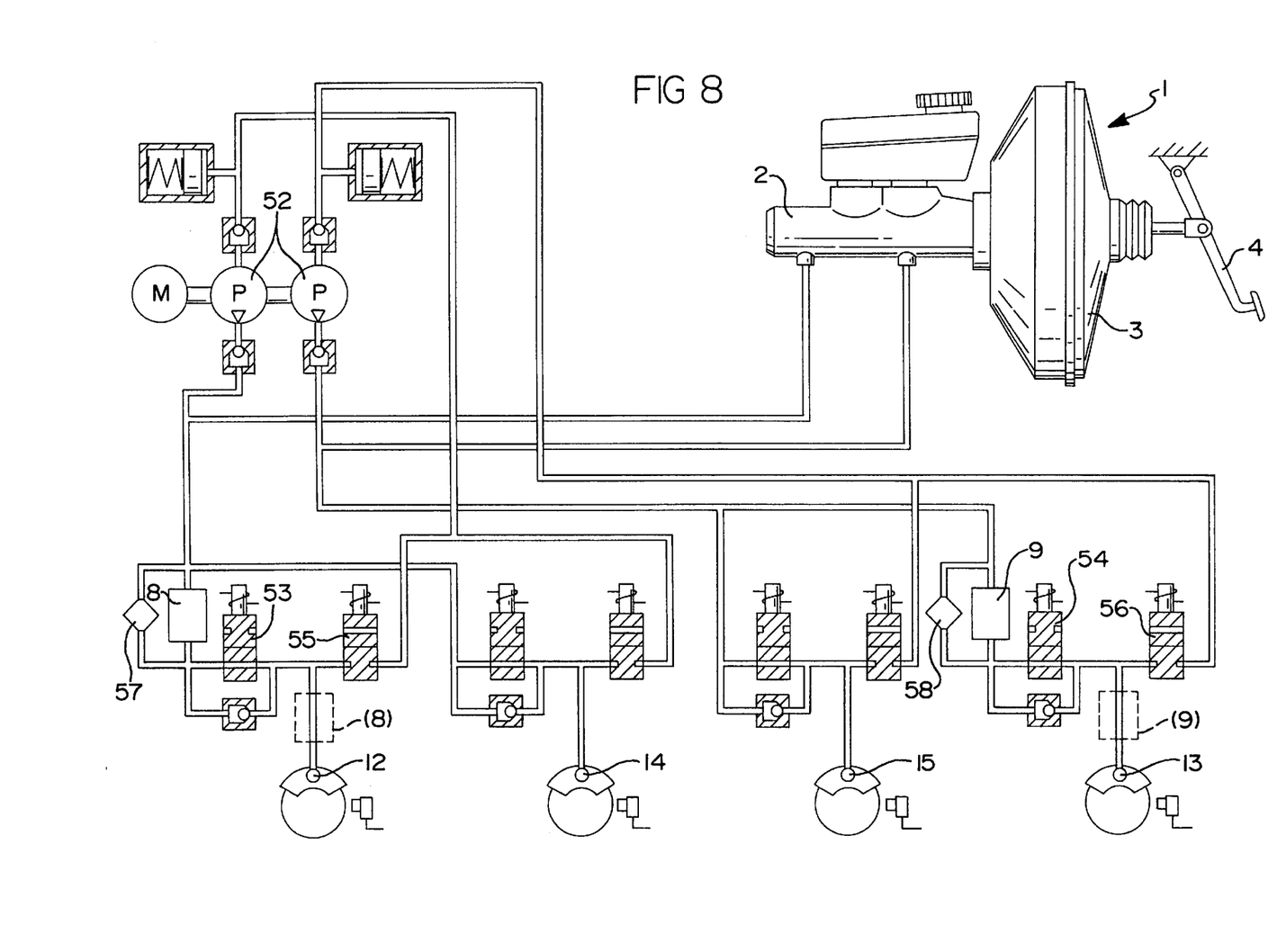
FIG. 8 is a hydraulic wiring diagram of a fourth embodiment of the brake system according to the present invention.

Finally, FIG. 8 shows a greatly simplified combination of the brake system of the present invention and an anti-lock or wheel slip control system operating according to the recirculation principle. For clarity reasons, both controllers 5, 6 are omitted in the illustration of FIG. 8. Electromagnetically operable actuator units 8, 9 are used in the embodiment shown. The actuator units 8, 9 are shown in FIGS. 2 to 4 and precede the wheel brake cylinders 12, 13 associated with the driven front axle. Inlet and outlet valves are provided to perform pressure modulation in the individual wheel brake cylinders 12 to 15 during anti-lock control. The inlet valves preceding wheel brake cylinders 12 and 13 of the driven front axle are assigned reference numerals 53 and 54, and the corresponding outlet valves carry reference numerals 55 and 56. The mentioned actuator units 8, 9 are connected in front of the inlet valves 53, 54 at the outlet of the pressure generator 1 or a return pump 52. The actuator (not shown) of the actuator unit 8, 9 is preferably a stroke magnet. The force of the stroke magnet is controlled irrespective of stroke in response to control signals of differential pressure sensors 57, 58 connected in parallel to the actuator units 8, 9. The sensors 57, 58 sense the difference in pressure between the inlet pressure, generated by the pressure generator 1 or the return pump 52, and the outlet pressure of the actuator unit 8, 9.

Another possibility of arranging the actuator units between the inlet valve 53, 54 and the wheel brake cylinder 12, 13 is shown in dotted lines in FIG. 8.

The inlet and outlet valves 53, 54, 55, 56 included in the previously mentioned hydraulic unit, the inlet and outlet valves associated with the other vehicle axle, and the return pump 52 are accommodated in a valve block in up-to-date wheel slip control systems. Therefore, integration of the actuator units 8, 9 in the valve block is appropriate.

During normal braking operations, pressure increase and pressure decrease is possible in the wheel brake cylinders by operation of the pressure generator 1 through the open connection, i.e., bore 26 in FIGS. 2 to 4 and FIG. 6, and the open inlet valves 53, 54 in FIG. 8 so that there is no difference over previous brake systems.

During braking operations with driving stability control, the external force which is controllable electrically (see FIGS. 1, 2 to 4 and 8) or hydraulically (see FIGS. 5, 6, and 7) acts on the piston 22 or 25 of the cylinder-and-piston assembly and moves the piston in the actuating direction of the wheel brake cylinders 12, 13 or 12 to 15. This causes the central valve 27 to close, and the force acting on the piston 22 or 25 generates a corresponding pressure in the wheel brake. With electromagnetic actuators in the shape of stroke magnets, it is important that the external force must be generated stroke-independently because otherwise the share in independent assist braking changes with an additional braking activity by the driver. For example, this generation of force can be achieved by proportional magnets or switching magnets with a controlled flow density. The necessary stroke can be limited by braking only one wheel in each case, and because the maximal external actuating force can be restricted to a value below the wheel-lock pressure value. When an electric motor with a spindle-and-nut drive is used, attention must be paid that self-locking engagement is prevented.

In the pressure/pressure-addition module shown in FIG. 6, the external force, in the capacity of a hydraulically generated pressure force, acts on the annular surface of large-diameter step 71 which is separated by a seal from the end surface of small-diameter step 70. Piston 25 can be a synchronizing piston, the ratio of transmission between the tandem master cylinder 2 and the wheel brake cylinders 12 to 15 being maintained. In the solution mentioned last, reduction of the actuating force generated by the driver on the wheel that is opposite the wheel braked by external force is also possible.

When brake application by the driver is initiated simultaneously with a braking operation with driving stability control, the pressure generated by the external actuation in the pressure chamber 23, shut off by the central valve 27, is increased directly by the amount of braking pressure which is generated by the driver and acts on the corresponding piston surface. Piston 22, 25 will move by the amount necessary for the pressure increase in the direction of the wheel brake cylinders 12 to 15. Thus, the fluid volume removed from the tandem master cylinder 2 corresponds to the usual increase in deceleration. The difference in pressure on piston 22, 25 is maintained and corresponds to the external brake force. Non-return valve 27 remains closed.

When a critical wheel slip condition occurs, depending on the control philosophy and requirements, either only the anti-lock system for the hydraulic brake is initially activated before the external force is decreased, or both actions are performed simultaneously, or vice-versa. To ensure a customary reaction effect on the driver's foot, activation of the standard ABS will be suitable.

Release during normal braking operations occurs directly. Independent assist braking is continued as long as it is activated.

If independent assist braking is activated as first, the biased piston 22, 25 is returned to its initial position because non-return valve 27 opens.

If braking with driving stability control follows a normal braking operation initiated by the driver, causing the wheel brake cylinders 12, 13, 14 and 15 to be prefilled through the open hydraulic connection, i.e., bore 26, the action of force of the independent assist braking causes closure of the central valve 27 and increase of the wheel braking pressure. When the driver pressure is reduced, piston 22, 25 will move in opposition to the actuating direction of the wheel brake cylinders, and the pressure prevailing therein is also reduced. If the amount of brake release is in excess of the portion of independent assist braking, the central valve 27 will "breather" in its closed position, and the fluid volume is conducted from the wheel brake cylinders to the tandem master cylinder 2 again.

The traction slip control function is shown by the same provisions as the driving stability control function. Thus, superposition occurs electronically and is unproblematic in hydraulic respects.

To minimize the expenditure in construction of the electric actuator, a two-channel system may be advisable in which the actuator, depending on the position of the valves, can alternatively act hydraulically on a right or a left wheel brake. Thus, stroke operation of only one wheel brake is required. The valves may be two normally open valves or one three-way/two-position directional control valve. In case there are no special demands on the distribution of external force to front and rear axles, the two wheel brakes on the driver side or on the passenger side can be actuated centrally by a correspondingly rated actuator. With independent assist braking that acts entirely independently of the normal brake, the independent assist braking system can be split up by sides.

We claim:

1. A brake system for automotive vehicles comprising:
    a pedal-operable pressure generator connected to wheel brake cylinders;
    a first actuator unit hydraulically connected between the pressure generator and a first wheel brake cylinder and configured to permit shutting off the hydraulic connections and being selectively actuatable independent of the pressure generator and having a first cylinder-and-piston assembly and a first electromagnetic actuator accommodated in a first housing and in which the piston is an armature of the first actuator;
    a second actuator unit hydraulically connected between the pressure generator and a second wheel brake cylinder and configured to permit shutting off the hydraulic connections and being selectively actuatable independent of the pressure generator and having a second cylinder-and-piston assembly and a second electromagnetic actuator accommodated in a second housing and in which the piston is an armature of the second actuator;
    wherein the piston in the cylinder-and-piston assembly of the first and the second actuator units is hollow and is sealedly guided on a cylindrical outlet port and defines in the housing a hydraulic annular chamber to which the hydraulic pressure of the pressure generator can be applied, and
    an electronic controller electrically connected with the first and second actuator units and providing control signals to actuate the actuator units wherein, on simultaneous actuation of the pressure generator and at least one of the first and the second actuator units, the force resulted from the pressure build-up in the pressure generator is added to the external actuating force generated by the respective at least one actuator and applied to the piston of the cylinder-and-piston assembly of the respective at least one actuator;
    wherein the respective at least one actuator is an electromagnet whose armature is the piston of the cylinder-and-piston assembly of the respective at least one actuator.

2. A brake system as claimed in claim 1, wherein the electromagnet is a stroke magnet whose action of force is controlled irrespective of stroke in response to signals of wheel slip.

3. A brake system as claimed in claim 1, wherein the electromagnet is a stroke magnet whose force is controlled in response to output signals of a differential pressure sensor sensing the pressure differential between the inlet pressure and the outlet pressure of the actuator unit.

4. A brake system as claimed in claim 1, wherein the piston is a stepped hollow piston which is sealedly guided on the cylindrical outlet port and defines in the housing a pneumatic annular chamber which is connected to the end surface of the large-diameter step remote from the pneumatic annular, chamber, and the small-diameter step is sealed in the housing and can be acted upon by the hydraulic pressure of the pressure generator.

5. A brake system as claimed in claim 4, where a filter element precedes the small-diameter step, serving additionally as a stop for a valve member of a central valve which shuts off the hydraulic connection between pressure generator and wheel brakes.

6. A brake system as claimed in claim 1, characterized in that it includes a hydraulic wheel slip control system which operates according to the recirculation principle, wherein the actuator units are arranged at the outlet of a return pump in front of an inlet valve respectively associated with a wheel brake cylinder.

7. A brake system as claimed in claim 1, further comprising a wheel slip control system includes inlet and outlet valves associated with the wheel brake cylinders, characterized in that the actuator units are interposed between the inlet valve respectively associated with a wheel brake cylinder and the related wheel brake cylinder.

* * * * *